(12) United States Patent
Ting

(10) Patent No.: US 7,852,316 B2
(45) Date of Patent: Dec. 14, 2010

(54) IMAGE PROCESSING METHOD OF POINTER INPUT SYSTEM

(75) Inventor: Li-Wen Ting, Toufen Township (TW)

(73) Assignee: Micro-Nits Co. Ltd., Toufen Township (TW)

(*) Notice: Subject to any disclaimer, the term of this patent is extended or adjusted under 35 U.S.C. 154(b) by 845 days.

(21) Appl. No.: 11/754,116

(22) Filed: May 25, 2007

(65) Prior Publication Data

US 2007/0290996 A1    Dec. 20, 2007

(30) Foreign Application Priority Data

Jun. 1, 2006    (TW) ............... 95119476 A

(51) Int. Cl.
G09G 5/08    (2006.01)

(52) U.S. Cl. .................. 345/157; 345/591; 345/604; 715/711; 715/764

(58) Field of Classification Search .............. 345/156, 345/157, 173, 591, 604; 178/18.01; 382/164; 702/95; 715/711, 764, 804
See application file for complete search history.

(56) References Cited

U.S. PATENT DOCUMENTS

| | | | |
|---|---|---|---|
| 5,371,537 A * | 12/1994 | Bohan et al. | 348/181 |
| 6,792,370 B2 * | 9/2004 | Satoh et al. | 702/95 |
| 7,161,589 B2 * | 1/2007 | Muir | 345/173 |
| 2001/0022575 A1 | 9/2001 | Woflgang | |
| 2005/0213846 A1 | 9/2005 | Matsuda et al. | |
| 2006/0001839 A1 | 1/2006 | Beardsley | |

FOREIGN PATENT DOCUMENTS

EP    1560429    8/2005

* cited by examiner

Primary Examiner—Abbas I Abdulselam
(74) Attorney, Agent, or Firm—Kirton & McConkie; Evan R. Witt

(57) ABSTRACT

The present invention relates to an image processing method of a pointer input system. In the image processing method, a color channel image is generated from an image pickup device, so that image processing capability, the image processing efficiency and the data transmitting speed of the pointer input system are enhanced.

25 Claims, 14 Drawing Sheets

210

220

230

IMAGE PROCESSING METHOD OF POINTER INPUT SYSTEM

FIELD OF THE INVENTION

The present invention relates to an image processing method, and more particularly to an image processing method of a pointer input system.

BACKGROUND OF THE INVENTION

In a conventional pointer input system, a light spot generated from a pointer generating device is displayed on a display screen, and the image of the display screen including the light spot is then captured by an image pickup device so as to obtain an output data relevant to the light-spot position and display a corresponding output pointer on the display screen. Generally, the image processing method of the pointer input system mainly includes a calibrating method and a tracking method. For performing the calibrating method, a aligning pattern is inputted onto the display screen, and the image of the display screen including the aligning pattern is then captured by the image pickup device to obtain a aligning data. After the aligning data is compared with a predetermined reference data, a space conversion relationship between the display screen and the image pickup device is obtained. For performing the tracking method, the image of the display screen including the light spot is captured by the image pickup device to obtain an output data relevant to the light-spot position according to the space conversion relationship. After the output data is processed by a data processing device, related output pointer is projected onto the display screen through an image projecting system.

Typically, a full-color image contains a variety of colors including for example a red color, a blue color and a green color. Since the full-color image is usually processed according to an arithmetic average or a weighted average of a red color value, a blue color value and a green color value, the characteristic properties of having different signal-to-noise ratios (S/N) and gains in each or composite color channel are not utilized to enhance the image processing capability. Under this circumstance, since the data amount of processing the full-color image is very huge, the image processing efficiency and the data transmitting speed fail to be increased and the stability of the pointer input system is impaired.

Therefore, there is a need of providing an image processing method of a pointer input system for increasing the image processing capability, the image processing efficiency and the data transmitting speed of the pointer input system.

SUMMARY OF THE INVENTION

It is an object of the present invention to provide an image processing method of a pointer input system for increasing the image processing capability, the image processing efficiency and the data transmitting speed of the pointer input system.

Another object of the present invention provides an image processing method of a pointer input system for use with a cathode ray tube (CRT) monitor, a liquid crystal display (LCD) screen, a plasma display panel or a projection screen.

In accordance with an aspect of the present invention, there is provided a calibrating method of a pointer input system. The calibrating method includes steps of displaying a aligning test pattern on a display screen, capturing the display screen by an image pickup device to obtain a aligning image including the aligning test pattern, generating a color channel image according to the aligning image, scanning a region of interest of the color channel image to obtain a aligning data, and comparing the aligning data with a predetermined reference data to obtain a space conversion relationship between the display screen and the image pickup device.

In accordance with another aspect of the present invention, there is provided a tracking method of a pointer input system. The tracking method includes steps of allowing a pointer generating device to issue a light spot on a display screen, capturing the display screen by an image pickup device to obtain a tracking image including the light spot, generating a color channel image according to the tracking image, eliminating background noise of the color channel image, scanning a region of interest of the color channel image to obtain a scan data, generating an output data associated with the position of the light spot according to a space conversion relationship and the scan data, and displaying a pointer corresponding to the light spot on the display screen through an image projecting system according to the output data.

By utilizing the characteristic properties of having different signal-to-noise ratios (S/N) and gain values in different color channels, the image processing capability of the pointer input system is enhanced. Instead of using the full-color image, a color channel image is processed. Since the data amount of processing the color channel image is largely reduced, the image processing efficiency and the data transmitting speed are both enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an image processing method of a pointer input system by referring to a color channel image of an image pickup device in order to increase the image processing capability, the image processing efficiency and the data transmitting speed of the pointer input system. The image processing method of the present invention includes a calibrating method and a tracking processing. By adjusting the resolution of the image pickup device, the image obtained during the calibrating method and the image obtained during the tracking method have different resolutions. For example, the resolution of the image obtained during the tracking method is smaller than that obtained during the calibrating method. As a consequence, the aligning accuracy and the tracking processing efficiency and transmitting speed are enhanced.

Figure 1:
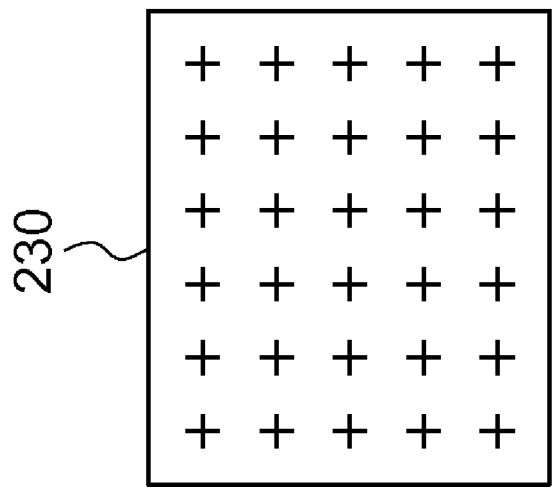
FIG. 1 schematically illustrates three typical aligning test patterns used in an image processing method of a pointer input system according to the present invention.
Figure 1:
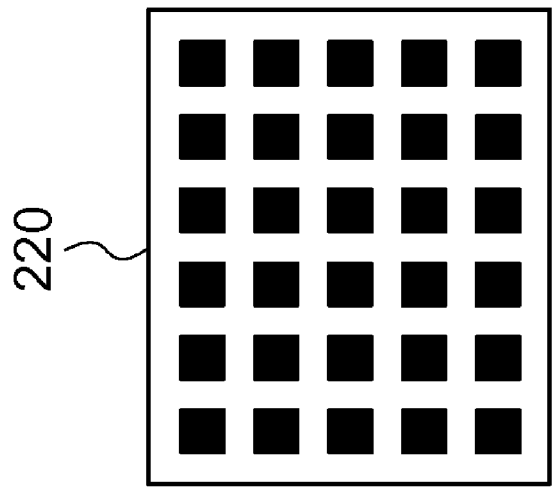
Figure 1:
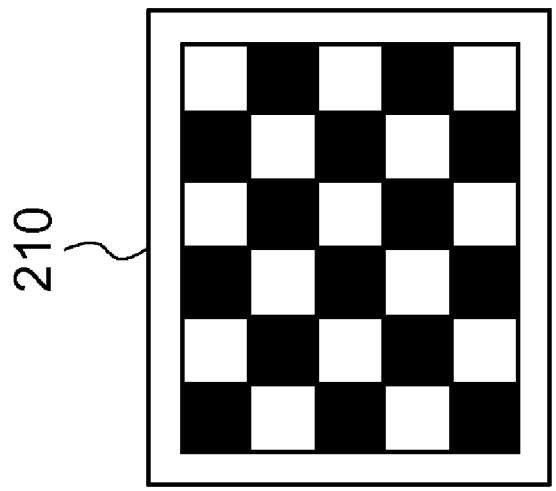

In FIG. 1, three typical aligning test patterns used in the calibrating method are schematically illustrated. The aligning test patterns of FIG. 1 include a checkerboard pattern 210, a block dot pattern 220 and a cross dot pattern 230, respectively. The aligning test patterns may have arbitrary patterns. In this context, the checkerboard pattern 210 is used for illustration.

Figure 2:
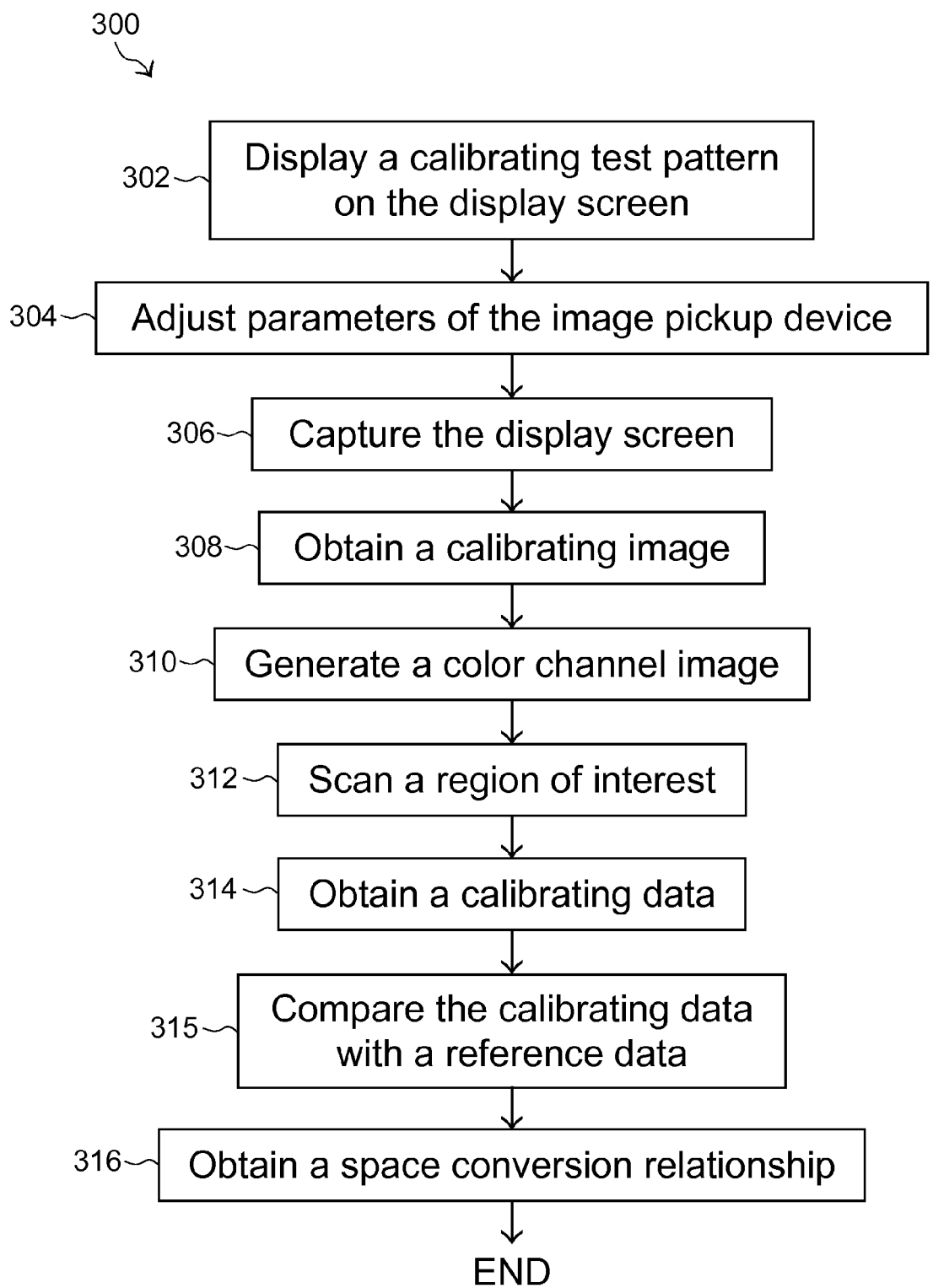
FIG. 2 is a flowchart illustrating a calibrating method of a pointer input system according to a first embodiment of the present invention.
Figure 3:
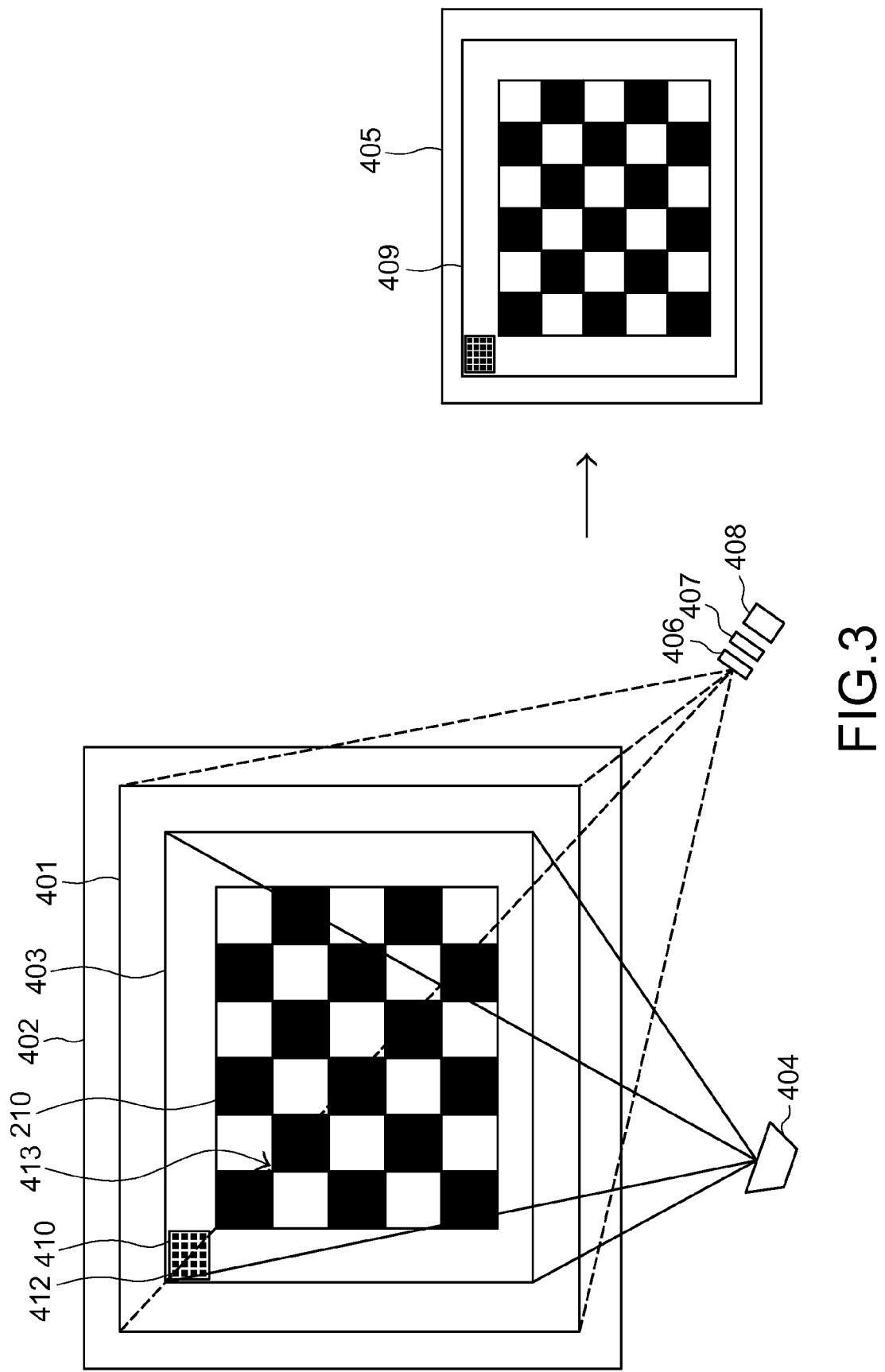
FIG. 3 is a schematic view of the pointer input system for implementing the calibrating method of FIG. 2.

FIG. 2 is a flowchart 300 illustrating a calibrating method of a pointer input system according to a first embodiment of the present invention. FIG. 3 is a schematic view of the pointer input system for implementing the calibrating method of FIG. 2. The pointer input system of FIG. 3 principally includes a display screen 402, an image projecting system 404 and an image pickup device 408.

Hereinafter, a calibrating method according to a first embodiment of the present invention will be illustrated with reference to FIG. 2 and FIG. 3.

Figure 4:
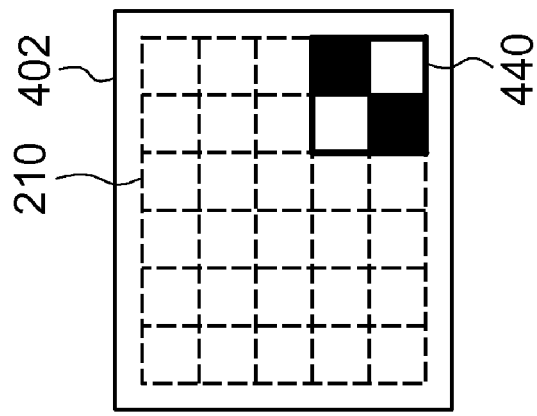
FIG. 4 schematically illustrates segmental patterns divided by a aligning test pattern to be successively projected onto the display screen.
Figure 4:
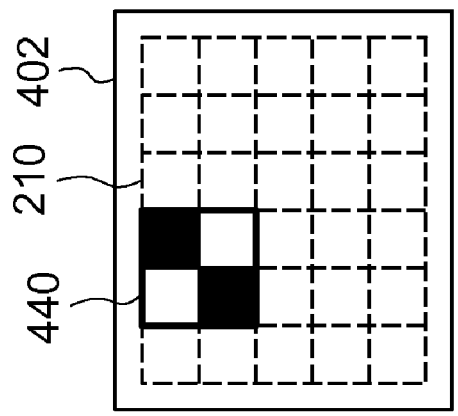
Figure 4:
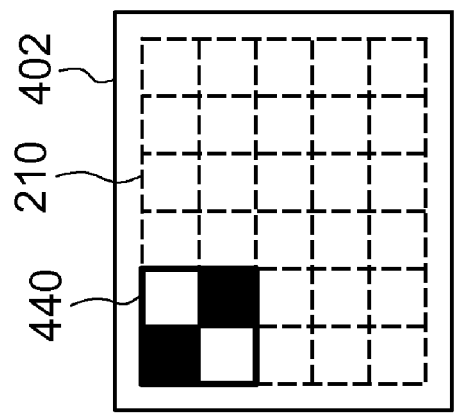
Figure 5:
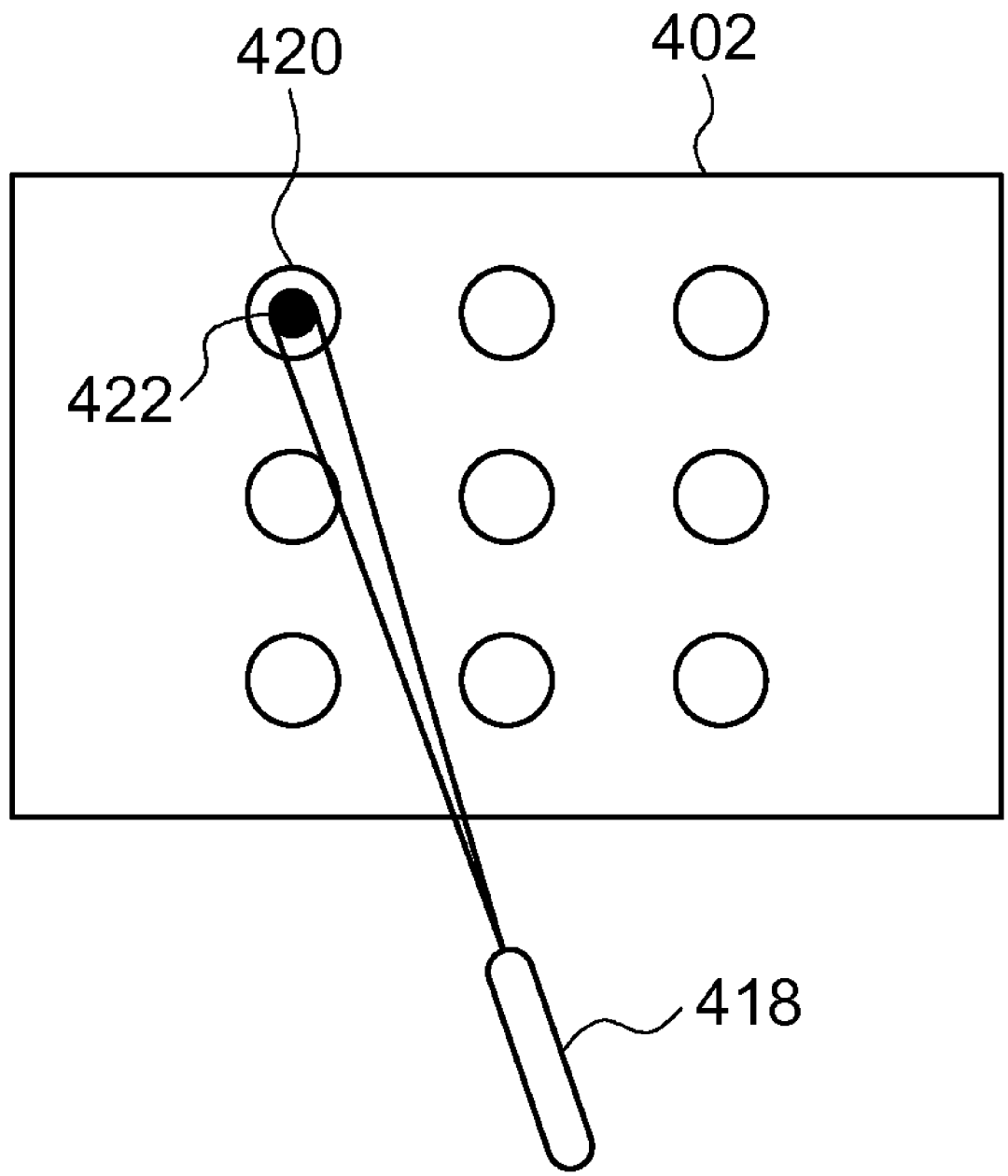
FIG. 5 schematically illustrates that light spots issued from a pointer generating device are projected onto specified locations of the display screen.
Figure 6:
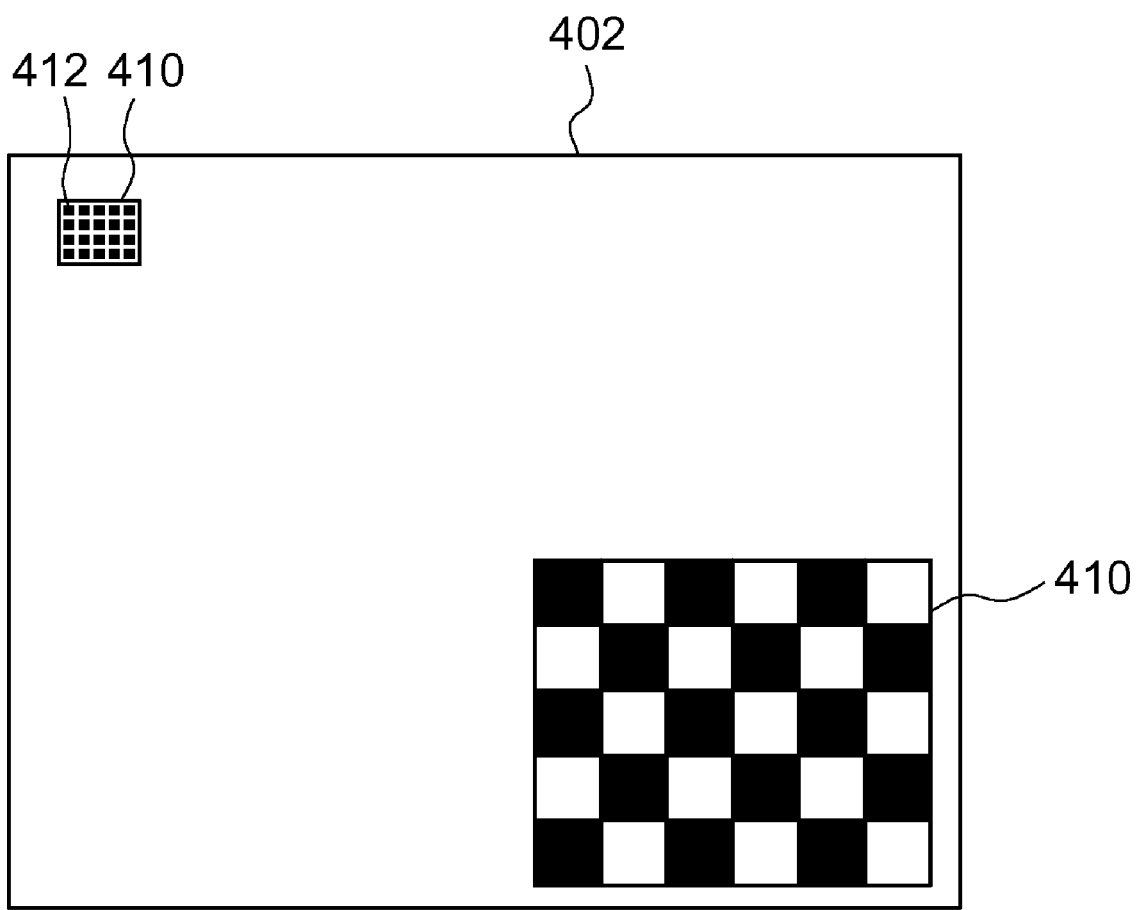
FIG. 6 schematically illustrates that a aligning test pattern is arranged at a corner of the display screen.

First of all, in Step 302, a aligning test pattern (e.g. the checkerboard pattern 210) is displayed on the display screen 402 through the image projecting system 404 (e.g. a projector). As shown in FIG. 4, the checkerboard pattern 210 is divided into multiple segmental patterns 440, e.g. 2×2 segmental patterns. These segmental patterns 440 are successively projected onto the display screen 402. Alternatively, as shown in FIG. 5, several light spots 422 issued from a pointer generating device 418 are projected onto specified locations 420 of the display screen 402. Alternatively, as shown in FIG. 6, the checkerboard pattern 210 may be arranged at different sites of the display screen 402. For example, the checkerboard pattern 210 may be arranged at a middle site, a corner or any arbitrary site of the display screen 402. After the calibrating method has been performed on different corners of the display screen 402, the interference from background noise is reduced. An example of the display screen 402 includes but is not limited to a cathode ray tube (CRT) monitor, a liquid crystal display (LCD) screen, a plasma display panel or a projection screen. By using the successive segmental patterns 440 of FIG. 4 or the light spots 422 of FIG. 5 as the aligning test pattern in replace of the whole checkerboard pattern 210, less counts of relevant reference points are sufficient for calibration.

Next, in Step 304, by adjusting the parameters including positions, exposure time, gamma values, gain values or brightness values of the image pickup device 408 (e.g. an array-type photosensing device), the numbers of recognized relevant marks 412 within a preview window 410 are varied and recorded. When the image having the highest number of recognized marks 412 is obtained, a capture field 401 and an optimal parameter of the image pickup device 408 are determined accordingly. In this embodiment, the locations of the marks 412 correspond to intersection points 413 of every four adjacent squares of the checkerboard pattern 210. In an embodiment, the image pickup device 408 may be fastened onto the display screen 402 or fixed in the vicinity of the image projecting system 404, so that the positional parameter of the image pickup device 408 is kept unchanged.

Next, after the display screen 402 is captured by the image pickup device 408 (Step 306), a aligning image 405 including the aligning test pattern is obtained (Step 308).

Next, according to the aligning image 405, a color channel image is generated (Step 310). The color channel image is a single color channel image or a composite color channel image included in the aligning image 405. For example, the color channel image is a red channel image or a composite red-and-blue channel image included in the aligning image 405. Optionally, a polarizer 406 and an optical filter 407 are disposed in front of the image pickup device 408 for filtering off the background noise from the image projecting system 404 or the surrounding light sources.

Next, in Step 312, a region of interest 409 of the color channel image is scanned. For example, the region of interest 409 corresponds to the input field 403 of the image projecting system 404. Since the image of the aligning test pattern or the input light spot is greater than one pixel, the region of interest 409 may be canned in alternate rows or in alternate columns so as to enhance the data transmitting speed and the processing speed. Moreover, since only the region of interest 409 is scanned, the interference from outside area of the region of interest 409 is minimized and the aligning accuracy is increased.

After the region of interest 409 is scanned, a aligning data is obtained (Step 314). Next, the aligning data is compared with a predetermined reference data with respect to the three dimensional coordinate system and the relative locations (Step 315). The reference data includes many spatial coordinate values of the checkerboard pattern 210. According to the aligning data, a space conversion relationship between the display screen 402 and the image pickup device 408 is calculated (Step 316). Meanwhile, the calibrating method of the image processing method of the pointer input system is implemented.

Figure 7:
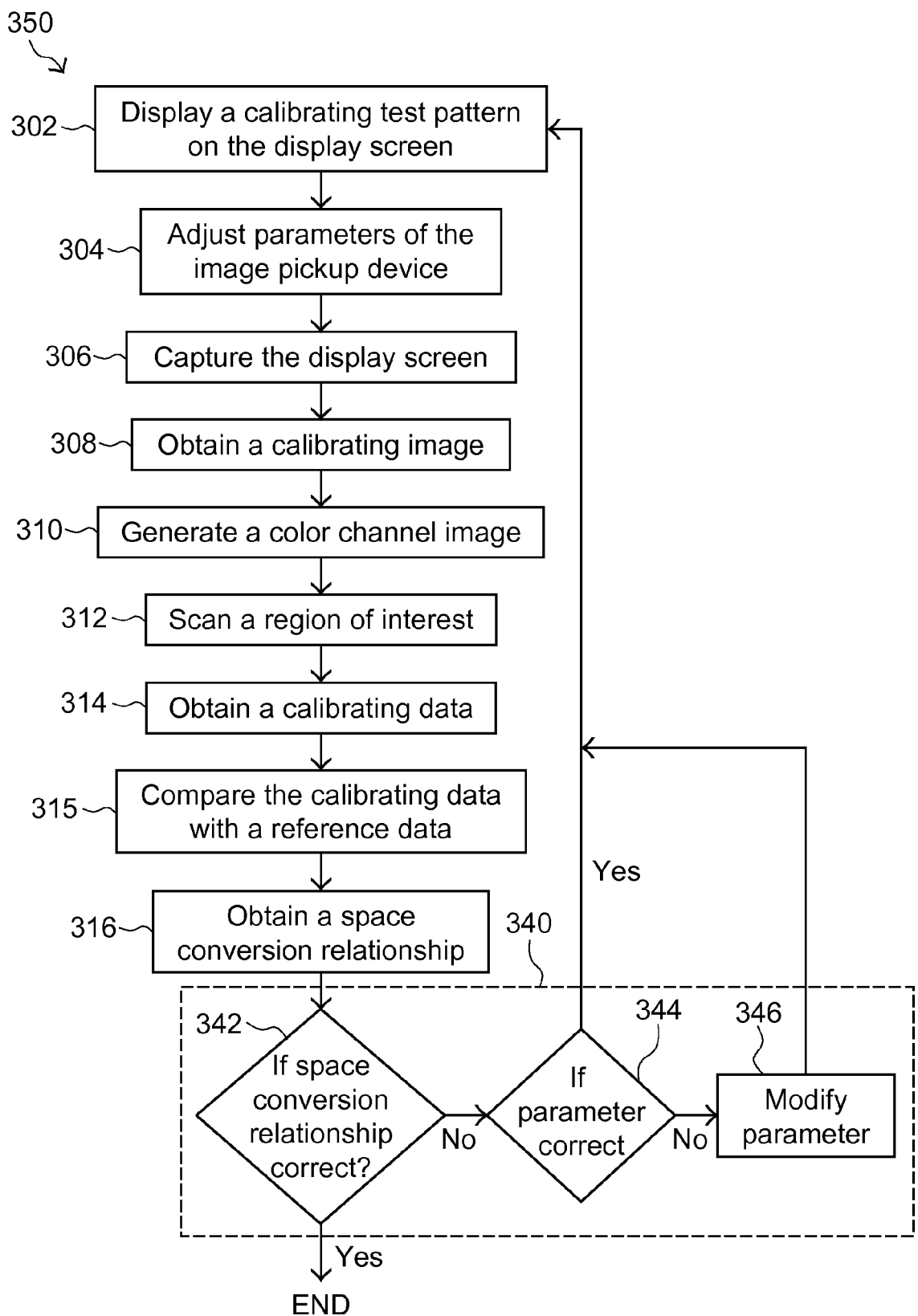
FIG. 7 is a flowchart illustrating a calibrating method of a pointer input system according to a second embodiment of the present invention.

A second embodiment of a calibrating method of the image processing method according to the present invention will be illustrated with reference to a flowchart 350 of FIG. 7. In this flowchart 300, the steps 302, 304, 306, 308, 310, 312, 314, 315 and 316 are identical to those described in the flowchart 300 of FIG. 2, and are not redundantly described herein. In this embodiment, a discriminating procedure 340 is included in the calibrating method of the present invention after Step 316. If a difference between the coordinate value of the aligning data converted by the space conversion relationship (e.g. the coordinate values of the intersection points 413 of the checkerboard pattern 210 converted by the space conversion relationship) and the coordinate value of the reference data is smaller than a threshold value (Step 342), the accuracy of the space conversion relationship is acceptable and the calibrating method is terminated. Otherwise, some important parameters of the pointer input system (e.g. the number of pixels per frame of the image projecting system 404 or the aspect ratio of the image projecting system 404) are automatically detected. If these parameters of the pointer input system are correct (Step 344), the above steps 302~316 are repeated to obtain a new space conversion relationship. Otherwise, after the parameters are modified (Step 346), the above steps 302~316 are repeated.

Figure 8:
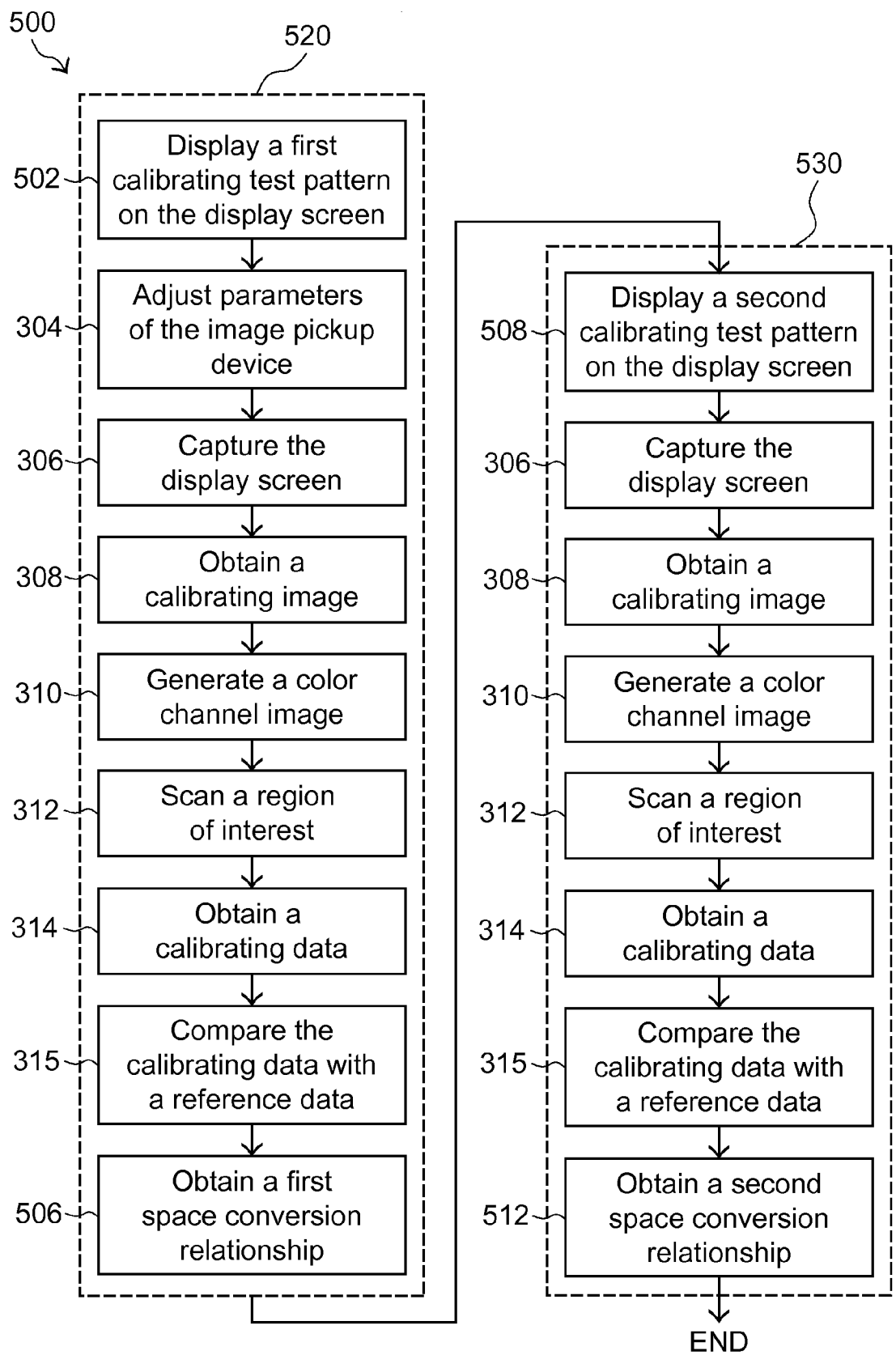
FIG. 8 is a flowchart illustrating a calibrating method of a pointer input system according to a third embodiment of the present invention.
Figure 9:
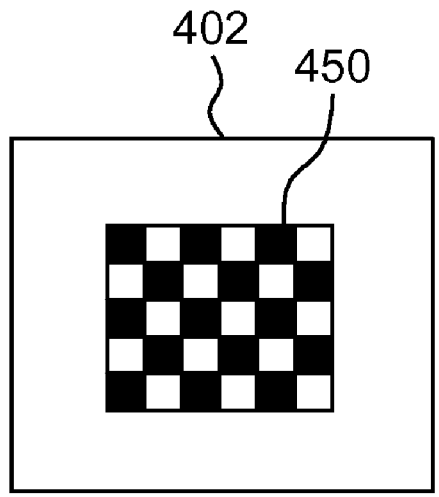
FIG. 9 schematically illustrates a aligning test pattern for used in a pre-calibrating method.
Figure 10:
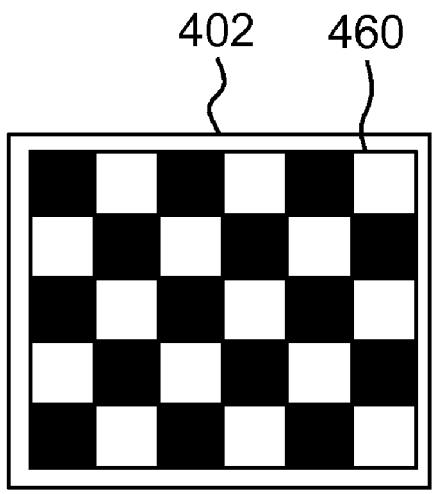
FIG. 10 schematically illustrates a aligning test pattern for used in a full-screen calibrating method.

A third embodiment of a calibrating method of the image processing method according to the present invention will be illustrated with reference to a flowchart 500 of FIG. 8. This calibrating method of FIG. 8 includes a pre-calibrating method 520 and a full-screen calibrating method 530. FIG. 9 and FIG. 10 schematically illustrate two aligning test patterns used in the pre-calibrating method 520 and the full-screen calibrating method 530, respectively. Hereinafter, the calibrating method according to the third embodiment of the present invention will be illustrated with reference to FIGS. 8, 9 and 10. First of all, in Step 502, a first aligning test pattern (e.g. a relatively smaller checkerboard pattern 450) is projected onto the display screen 402 through the image projecting system 404 (e.g. a projector). Then, the steps 302, 304, 306, 308, 310, 312, 314 and 315, which are identical to those described in FIG. 2, are carried out to obtain a first space conversion relationship between the display screen 402 and the image pickup device 408 is calculated (Step 506). Meanwhile, the pre-calibrating method 520 is implemented. Next, in Step 508, a second aligning test pattern (e.g. a relatively larger checkerboard pattern 460) is projected onto the display screen 402 through the image projecting system 404. Then, the steps 306, 308, 310, 312, 314 and 315 are carried out again to obtain a second space conversion relationship between the display screen 402 and the image pickup device 408 is calculated (Step 512). Meanwhile, the full-screen calibrating method 530 is implemented. For enhancing convenience, it is preferred that the full-screen calibrating method 530 is automatically performed. Optionally, the discriminating procedure 340 as described in FIG. 7 is done after the pre-calibrating method 520 or the full-screen calibrating method 530, thereby discriminating whether the accuracy of the first space conversion relationship or the second space conversion relationship is acceptable.

Figure 11:
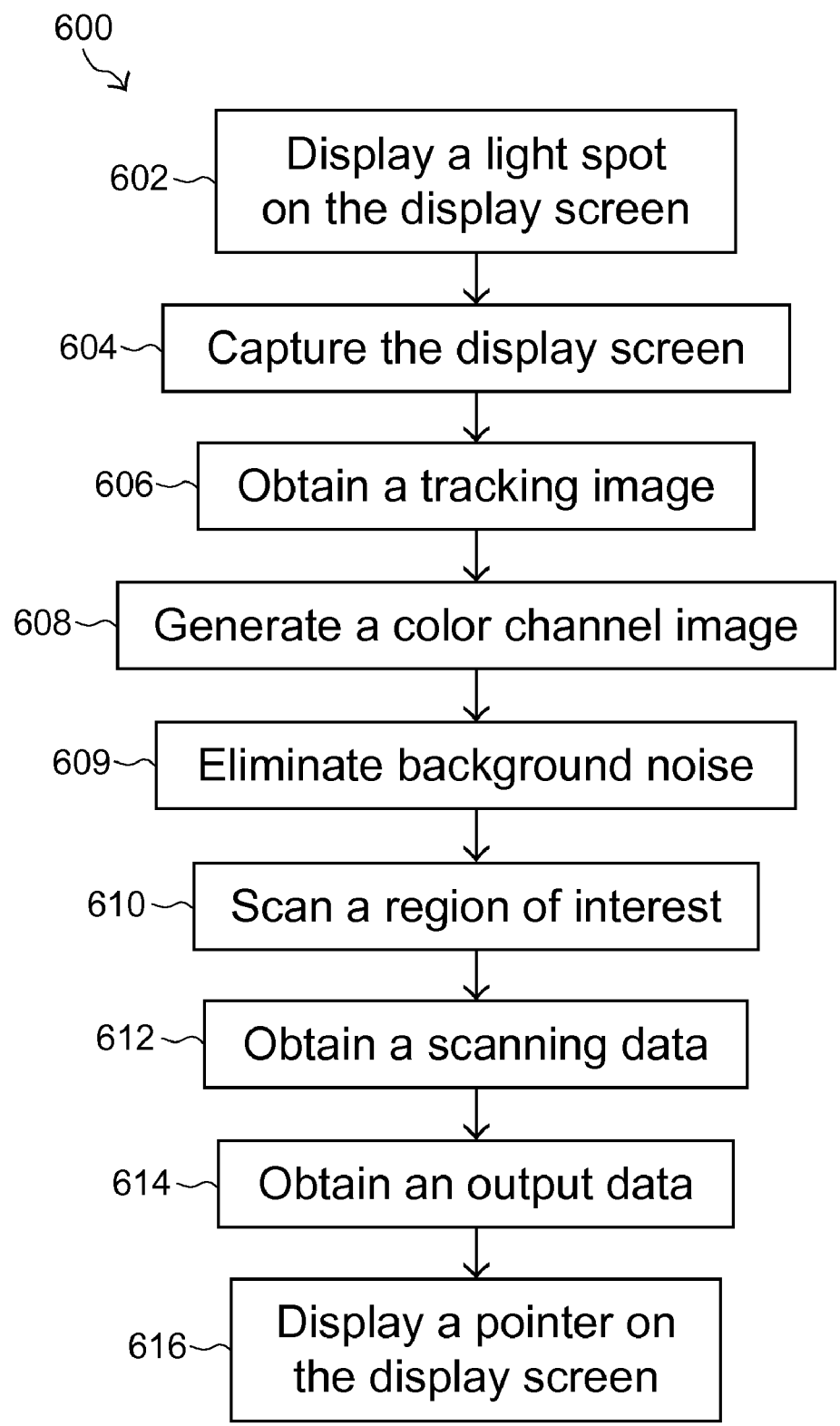
FIG. 11 is a flowchart illustrating a tracking method of a pointer input system according to an embodiment of the present invention.
Figure 12:
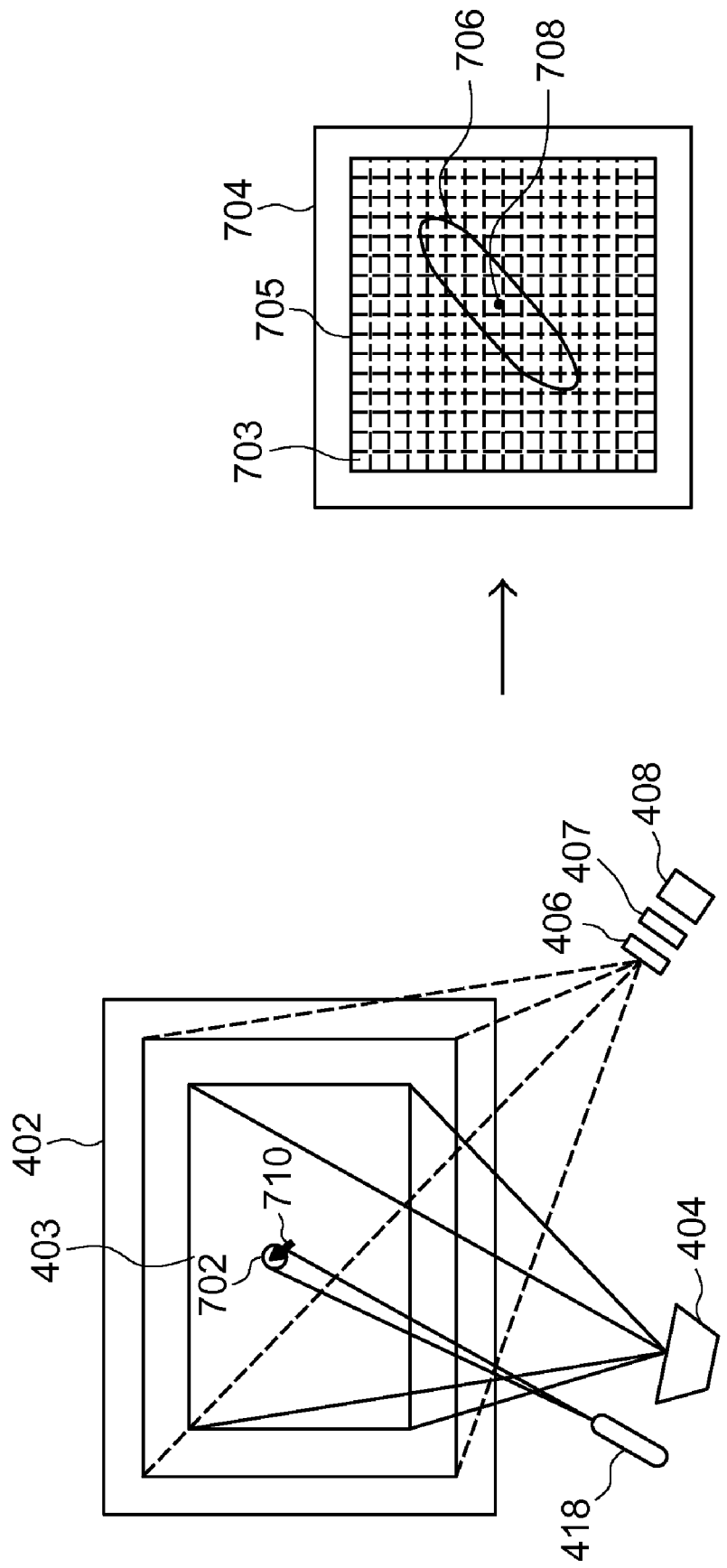
FIG. 12 is a schematic view of the pointer input system for implementing the tracking method of FIG. 11.

FIG. 11 is a flowchart 600 illustrating a tracking method of the image processing method of the pointer input system according to the present invention. FIG. 12 is a schematic view of the pointer input system for implementing the tracking method. Please refer FIGS. 11 and 12. In the step 602, a light spot 702 issued from a pointer generating device 418 is projected onto the display screen 402. After the display screen 402 including the light spot 702 is captured by the image pickup device 408 (Step 604), a tracking image 704 is generated (Step 606). The tracking image 704 is composed of multiple pixels 703. The image pickup device 408 is for example an array-type photosensing device. Since the sensor of the image pickup device 408 has a response time, the image of the light spot 702 on the tracking image 704 is substantially an elongated zone 706. Next, according to the tracking image 704, a color channel image is obtained (Step 608). The color channel image is a single color channel image or a composite color channel image included in the tracking image 704. For example, the color channel image is a red channel image or a composite red-and-blue channel image included in the tracking image 704. Since the background noise resulting from the image projecting system 404 or the surrounding light sources may interfere with the color channel image, the background noise is eliminated (Step 609). For example, a polarizer 406 and an optical filter 407 (or a dual-band filter or a multi-band filter) are disposed in front of the image pickup device 408 for filtering off the background noise. Next, in Step 610, a region of interest 705 of the color channel image is scanned. For example, the region of interest 705 corresponds to the input field 403 of the image projecting system 404. Since the size of the elongated zone 706 is more than one pixel 703, the region of interest 705 may be canned in alternate rows or in alternate columns so as to enhance the data transmitting speed and the processing speed. Moreover, since only the region of interest 705 is scanned, the interference from outside area of the region of interest 705 is minimized and the tracking accuracy is increased. After the region of interest 409 is scanned, a scan data is obtained (Step 612). Next, according to the space conversion relationship obtained in a calibrating method and the scan data, an output data associated with the position of the light spot 702 is generated (Step 614). For example, specified optical attributes (e.g. the gray scales or 8-bit brightness values) for all pixels 703 included in the elongated zone 706 are measured. The characteristic values of respective pixels 703 are substantially weight coefficients. A central position 708 of the elongated zone 706 is obtained by calculating the weighted average of the 8-bit brightness values of all pixels 703 included in the elongated zone 706. That is, the central position 708 is at the center of mass of the elongated zone 706. Alternatively, the central position 708 of the elongated zone 706 is situated at the pixel having the maximum optical attribute or the pixel having the critical optical attribute. In this present invention, the optical attribute includes but is not limited to brightness, color, size or shape. More especially, the output data is generated after the central position 708 of the elongated zone 706 is subject to a space conversion according to the space conversion relationship. In the prior art, the pixels are denoted as either bright spot or non-bright spot by evaluating 2-bit brightness values of the pixels. Whereas, according to the present invention, the weighted average of the 8-bit brightness values of all pixels 703 included in the elongated zone 706 is much more precise for searching the light-spot position. In, the resolution of the image pickup device 408 is largely increased. Next, according to the output data generated in Step 614, a pointer 710 corresponding to the light spot 702 is displayed on the display screen 402 through the image projecting system 404 (Step 616).

Figure 13:
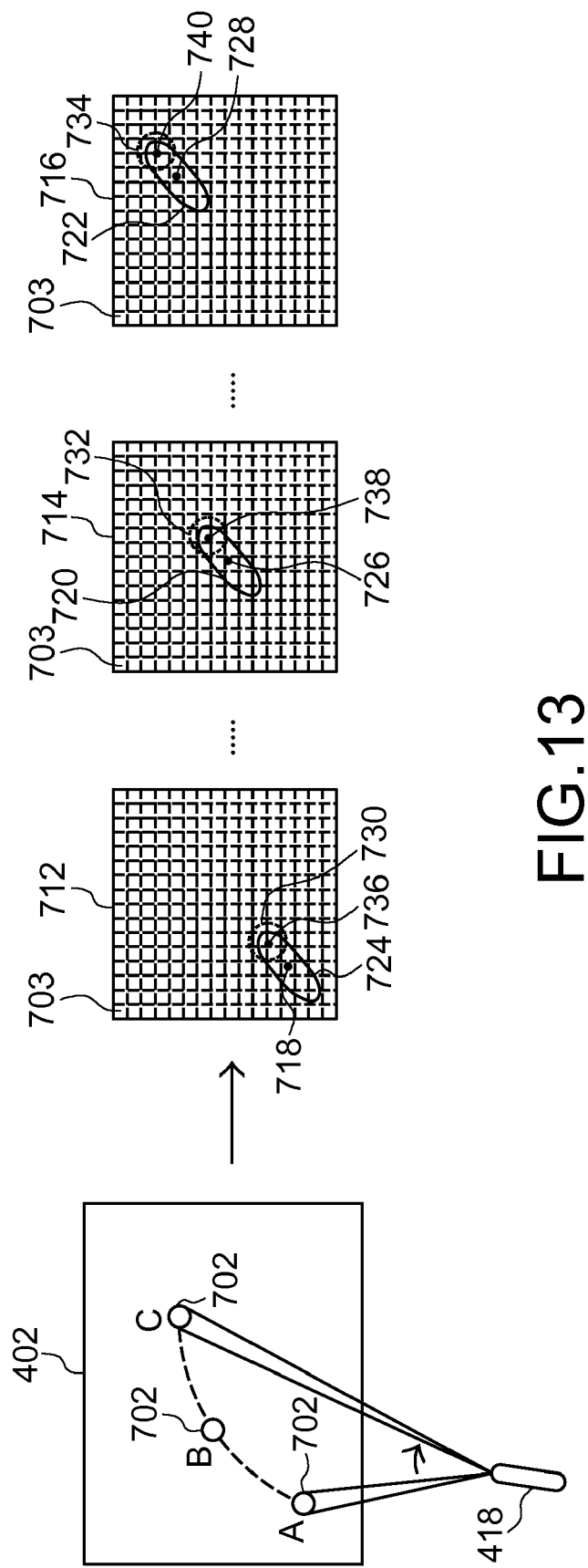
FIG. 13 is a flowchart illustrating a tracking method of a pointer input system according to another embodiment of the present invention.

FIG. 13 is a schematic view of the pointer input system for implementing the tracking method according to another embodiment of the present invention. The light spot 702 issued from the pointer generating device 418 is projected onto a point A the display screen 402 and moved to the point C through the point B. The display screen 402 including the light spot 702 are continuously captured by the image pickup device 408, thereby successively generating tracking images 712, 714 and 716. By the steps described above, the central positions 724, 726 and 728 of the elongated zones 718, 720 and 722 of the tracking images 712, 714 and 716 are calculated and recorded. As a consequence, continuous moving actions and relative positions of the continuously captured light spots 702 are monitored and tracked. After the central positions 724, 726 and 728 are subject to space conversions according to the space conversion relationship, corresponding output data are generated and displayed on the display screen 402 through the image projecting system 404. Likewise, the central positions 724, 726 and 728 of the elongated zones 718, 720 and 722 are obtained at the center of mass, the pixel having the maximum optical attribute or the pixel having the critical optical attribute. In this present invention, the optical attribute includes but is not limited to brightness, color, size or shape.

Moreover, according to the moving direction of the light spot 702, respective terminal portions 730, 732 and 734 of the elongated zones 718, 720 and 722 are defined. For example, one third of the elongated zone 718, 720 or 722 at the rear along the moving direction may be defined as the terminal portions 730, 732 or 734. Likewise, the central positions 736, 738 and 740 of the terminal portions 730, 732 and 734 are obtained, respectively. After the central positions 736, 738 and 740 of the terminal portions 730, 732 and 734 are subject to space conversions according to the space conversion relationship, the track corresponding to the moving spot 702 are generated and displayed on the display screen 402 through the image projecting system 404. As a consequence, a time delay resulting from data processing and transmission is reduced and the inconsistence between the input data and the output data will be minimized.

Figure 14:
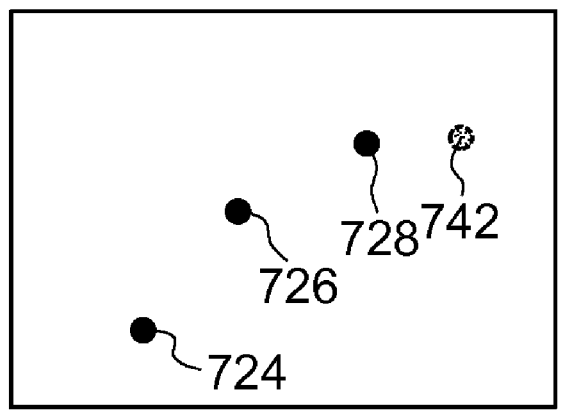
FIG. 14 is a schematic view illustrating an anticipated extrapolation position constructed from known central positions of the elongated zones by extrapolation algorithm.

As shown in FIG. 14, the central positions 724, 726 and 728 of the elongated zones 718, 720 and 722 are recognized. By extrapolation algorithm, at least an extrapolation position 742 beyond the set of known positions 724, 726 and 728 will be anticipated. Consequently, the problem of causing time delay is reduced.

Figure 15:
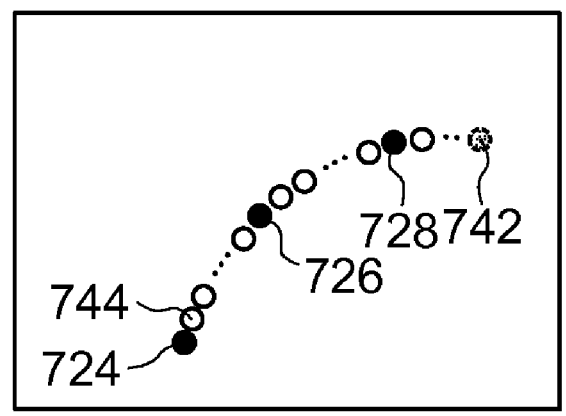
FIG. 15 is a schematic view illustrating an interpolation position constructed from known central positions of the elongated zones and the extrapolation position by interpolation algorithm.

Moreover, as shown in FIG. 15, at least an interpolation position 744 is obtained from the known central positions 724, 726 and 728 and the extrapolation position 742 by interpolation algorithm (e.g. linear or bilinear interpolation algorithm). As the number of the interpolation position 744 is increase, the movement of the pointer looks smoother.

Alternatively, for further reducing the delay time, at least an extrapolation position beyond the set of known central positions 736, 738 and 740 of the terminal portions 730, 732 and 734 may be anticipated by extrapolation algorithm. Moreover, several interpolation positions may be obtained from the known central positions 736, 738 and 740 and the extrapolation position 742 by interpolation algorithm, so that the movement of the pointer looks much smoother.

In an embodiment, multiple pointer generating devices 418 are employed to project a plurality of light spots 702 onto the display screen 402, so that the purpose of implementing multi-input or opinion exchange will be achieved.

Figure 16:
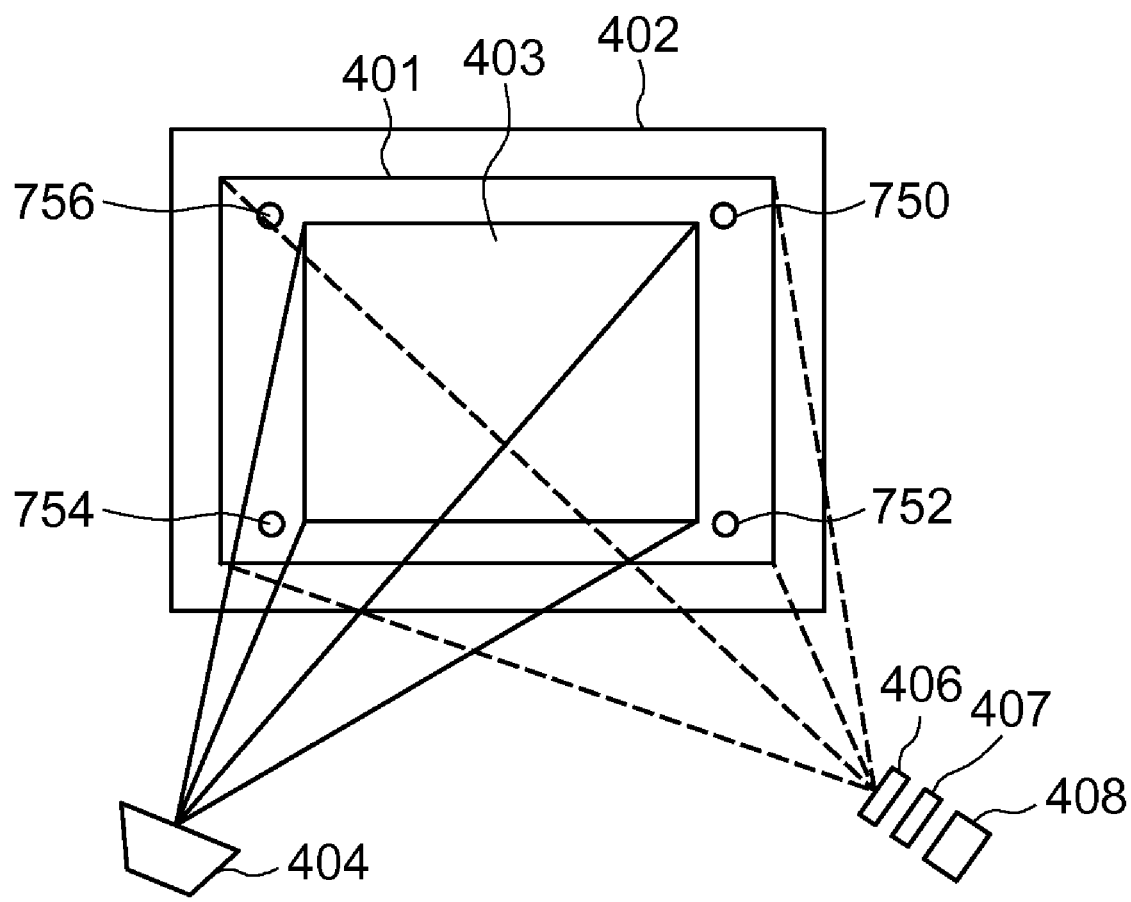
FIG. 16 is a schematic view illustrating some sensing points for discriminating change of the surrounding's light.

FIG. 16 schematically illustrating a method of detecting change of the surrounding's light by using the pointer input system of the present invention. For example, several sensing points 750, 752, 754 and 756 are disposed within the capture field 401 for the image pickup device 408. If the change of the surrounding's light is over a predetermined signal level, it is meant that the background noise is increased. Under this circumstance, the gain values may be automatically adjusted and thus the influence of the light emitted from the image projecting system 404 is minimized. Alternatively, the predetermined signal levels of the sensing points 750, 752, 754 and 756 are different. Moreover, the number, size and location of the sensing points 750, 752, 754 and 756 may be varied as required.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A calibrating method of a pointer input system, said calibrating method comprising steps of:
   (a) displaying an aligning test pattern on a display screen;
   (b) capturing said display screen by an image pickup device, thereby obtaining an aligning image including said aligning test pattern;
   (c) generating a color channel image according to said aligning image, wherein said color channel image is a single color channel image or a composite color channel image included in said aligning image;
   (d) scanning a region of interest of said color channel image, thereby obtaining an aligning data; and
   (e) comparing said aligning data with a predetermined reference data to obtain a space conversion relationship between said display screen and said image pickup device, wherein said reference data includes many spatial coordinate values of said aligning test pattern.

2. The calibrating method according to claim 1 wherein the step (a) includes sub-steps of:
   projecting said aligning test pattern onto said display screen through an image projecting system; and
   successively projecting multiple segmental patterns of said aligning test pattern onto said display screen through said image projecting system, or projecting several light spots from a pointer generating device onto specified locations of said display screen;
   wherein said aligning test pattern includes a checkerboard pattern, a block dot pattern or a cross dot pattern, wherein said image projecting system includes a projector, and wherein said display screen is a cathode ray tube monitor, a liquid crystal display screen, a plasma display panel or a projection screen.

3. The calibrating method according to claim 1 wherein said aligning test pattern is arranged at a middle site, a corner or any arbitrary site of said display screen.

4. The calibrating method according to claim 1 wherein said region of interest corresponds to an input field of an image projecting system, and wherein in the step (d), the pixels of said region of interest of said color channel image are scanned in alternate rows or in alternate columns.

5. The calibrating method according to claim 1 further comprising steps of:
   discriminating the accuracy of said space conversion relationship, wherein said calibrating method is terminated if the accuracy of said space conversion relationship is acceptable;
   detecting some parameters of said pointer input system if the accuracy of said space conversion relationship is unacceptable;
   repeating the steps (a).about.(e) if said parameters of said pointer input system are correct; and
   modifying said parameters of said pointer input system if said parameters of said pointer input system are incorrect, and repeating the steps (a).about.(e).

6. The calibrating method according to claim 5 wherein the step of discriminating the accuracy of said space conversion relationship is performed by comparing the coordinate values of said aligning data converted by said space conversion relationship with the coordinate value of said reference data, and wherein the step of detecting some parameters of said pointer input system is performed by detecting a number of pixels per frame of an image projecting system and an aspect ratio of said image projecting system.

7. The calibrating method according to claim 1 further comprising steps of:

displaying a second aligning test pattern on said display screen;

capturing said display screen by said image pickup device, thereby obtaining a second aligning image including said second aligning test pattern;

generating a second color channel image according to said second aligning image;

eliminating background noise of said second color channel image;

scanning a region of interest of said second color channel image, thereby obtaining a second aligning data; and comparing said second aligning data with a predetermined reference data to obtain a second space conversion relationship between said display screen and said image pickup device.

8. The calibrating method according to claim 7 wherein the step of displaying said second aligning test pattern on said display screen is performed by projecting said aligning test pattern onto said display screen through an image projecting system; wherein said aligning test pattern includes a checkerboard pattern, a block dot pattern or a cross dot pattern, wherein said image projecting system includes a projector, and wherein said second aligning test pattern is larger than said aligning test pattern.

9. The calibrating method according to claim 7 wherein said second color channel image is a single color channel image or a composite color channel image included in said second aligning image, and wherein the pixels of said region of interest of said second color channel image are scanned in alternate rows or in alternate columns.

10. The calibrating method according to claim 1 further comprising steps of:

automatically optimizing a parameter of said image pickup device;

detecting the number of recognized marks within a preview window of said display screen, thereby realizing a capture field of said image pickup device and an optimal parameter of said image pickup device; and arranging a polarizer and an optical filter or a dual-band filter or a multi-band filter between said image pickup device and said display screen for filtering off background noise.

11. The calibrating method according to claim 1 wherein said image pickup device includes an array-type photosensing device.

12. A tracking method of a pointer input system, said pointer input system comprising a display screen and an image pickup device, said pointer input system having been calibrated by using said image pickup device to generate a aligning image and generate a space conversion relationship between said display screen and said image pickup device according to said aligning image, said tracking method comprising steps of:

allowing a pointer generating device to issue a light spot on said display screen;

capturing said display screen by said image pickup device, thereby obtaining a tracking image including said light spot;

generating a color channel image according to said tracking image;

eliminating background noise of said color channel image;

scanning a region of interest of said color channel image, thereby obtaining a scan data;

generating an output data associated with the position of said light spot according to said space conversion relationship and said scan data; and displaying a pointer corresponding to said light spot on said display screen through an image projecting system according to said output data.

13. The tracking method according to claim 12 wherein said color channel image is a single color channel image or a composite color channel image included in said aligning image, wherein said region of interest corresponds to an input field of said image projecting system, and wherein the pixels of said region of interest of said color channel image are scanned in alternate rows or in alternate columns.

14. The tracking method according to claim 12 wherein the step of generating said scan data includes sub-steps of:

measuring specified optical attributes of all pixels included in said color channel image according to gray scales of said image pickup device;

defining said optical attributes of all pixels as weight coefficients; and obtaining a central position of said light spot according to said weight coefficients.

15. The tracking method according to claim 14 wherein said central position is situated at the center of mass of said light spot, the pixel having the maximum optical attribute or the pixel having the critical optical attribute, wherein said optical attributes include brightness, color, size or shape, and wherein said gray scales include 8-bit brightness values.

16. The tracking method according to claim 12 further comprising a step of detecting signal levels of several sensing points, and automatically adjusting gain values of said image pickup device according to said signal levels.

17. The tracking method according to claim 12 further comprising a step of arranging a polarizer and an optical filter or a dual-band filter or a multi-band filter between said image pickup device and said display screen for filtering off background noise, wherein said image pickup device includes an array-type photosensing device and wherein said display screen is a cathode ray tube monitor, a liquid crystal display screen, a plasma display panel or a projection screen.

18. A tracking method of a pointer input system, said pointer input system comprising a display screen and an image pickup device, said pointer input system having been calibrated by using said image pickup device to generate a aligning image and generate a space conversion relationship between said display screen and said image pickup device according to said aligning image, said tracking method comprising steps of:

allowing a pointer generating device to issue a moving light spot on said display screen;

capturing said display screen by said image pickup device, thereby obtaining multiple tracking images including said light spot;

generating respective color channel images according to said tracking images;

eliminating background noise of said color channel images;

scanning regions of interest of said color channel images, thereby obtaining respective scan data;

generating respective output data associated with the positions of said light spot according to said space conversion relationship and said scan data; and displaying a track corresponding to said moving spot on said display screen through an image projecting system according to said output data.

19. The tracking method according to claim 18 wherein said color channel image is a single color channel image or a composite color channel image included in said aligning image.

20. The tracking method according to claim 18 wherein the step of generating said scan data includes sub-steps of:
- measuring specified optical attributes of all pixels included in said color channel images according to gray scales of said image pickup device;
- defining said optical attributes of all pixels as weight coefficients;
- obtaining central positions of said light spot for respective scan data according to said weight coefficients; and
- continuously recording said central positions, thereby monitoring continuous movement of said light spot and tracking a moving direction of said light spot.

21. The tracking method according to claim 20 further comprising a step of constructing an extrapolation position from said central positions of said light spot along said moving direction of said light spot by extrapolation algorithm or further comprising a step of constructing an interpolation position from said central positions of said light spot and said extrapolation position by interpolation algorithm.

22. The tracking method according to claim 20 further comprising a step of constructing an interpolation position from said central positions of said light spot by interpolation algorithm.

23. The tracking method according to claim 18 wherein the step of generating said scan data includes sub-steps of:
- measuring specified optical attributes of all pixels included in said color channel images according to gray scales of said image pickup device;
- defining said optical attributes of all pixels as weight coefficients;
- obtaining first central positions of said light spot for respective scan data according to said weight coefficients;
- continuously recording said first central positions, thereby monitoring continuous movement of said light spot and tracking a moving direction of said light spot;
- defining terminal portions of said light spot for respective scan data along said moving direction; and
- obtaining second central positions of respective terminal portions according to said weight coefficients.

24. The tracking method according to claim 23 further comprising a step of constructing an extrapolation position from said second central positions of said light spot along said moving direction of said light spot by extrapolation algorithm or further comprising a step of constructing an interpolation position from said second central positions of said light spot and said extrapolation position by interpolation algorithm.

25. The tracking method according to claim 23 further comprising a step of constructing an interpolation position from said second central positions of said light spot by interpolation algorithm.

* * * * *